United States Patent
Chen et al.

(10) Patent No.: US 10,149,188 B2
(45) Date of Patent: Dec. 4, 2018

(54) WIRELESS COMMUNICATION METHOD AND DEVICE

(71) Applicant: MEDIATEK INC., Hsin-Chu (TW)

(72) Inventors: Lai Chen, Taipei (TW); Chen-Yi Wang, Zhubei (TW); Hsin-Ju Lee, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 57 days.

(21) Appl. No.: 15/365,098

(22) Filed: Nov. 30, 2016

(65) Prior Publication Data

US 2017/0339586 A1    Nov. 23, 2017

Related U.S. Application Data

(60) Provisional application No. 62/340,010, filed on May 23, 2016.

(51) Int. Cl.
*H04W 24/08* (2009.01)
*H04B 17/309* (2015.01)
*H04W 68/00* (2009.01)
*H04W 88/06* (2009.01)

(52) U.S. Cl.
CPC .......... *H04W 24/08* (2013.01); *H04B 17/309* (2015.01); *H04W 68/00* (2013.01); *H04W 88/06* (2013.01)

(58) Field of Classification Search
CPC ............................ H04W 24/08; H04W 76/048
USPC .................................................. 370/311–339
See application file for complete search history.

(56) References Cited

U.S. PATENT DOCUMENTS

| 9,313,109 B1 | 4/2016 | Majumder et al. | |
| 2003/0008691 A1* | 1/2003 | Chen ..................... | H04W 68/00 455/574 |
| 2013/0064151 A1* | 3/2013 | Mujtaba ............... | H04B 7/0817 370/311 |
| 2013/0150095 A1* | 6/2013 | Mehio ................... | H04W 8/183 455/458 |
| 2014/0220916 A1 | 8/2014 | Mujtaba et al. | |

* cited by examiner

*Primary Examiner* — Iqbal Zaidi
(74) *Attorney, Agent, or Firm* — McClure, Qualey & Rodack LLP (57) ABSTRACT

A wireless communication method and device are provided. The wireless communication method includes the steps of directly monitoring a paging channel (PCH) without detecting a paging indicator (PI) in a paging indicator channel (PICH) by user equipment; and decoding data of the PCH by the user equipment. The wireless communication method further includes the step of monitoring the PCH according to information of the PCH received from a network.

6 Claims, 6 Drawing Sheets

WIRELESS COMMUNICATION METHOD AND DEVICE

CROSS REFERENCE TO RELATED APPLICATIONS

This Application claims priority of U.S. Provisional Patent Application No. 62/340,010, filed on May 23, 2016, the entirety of which is incorporated by reference herein.

BACKGROUND OF THE INVENTION

Field of the Invention

The invention generally relates to a wireless communication technology, and more particularly, to a wireless communication method for monitoring a paging channel (PCH) directly without detecting a paging indicator (PI) in a paging indicator channel (PICH).

Description of the Related Art

Wireless communication systems are widely used to provide various telecommunication services such as telephony, video, data, messaging, and broadcast services. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lowering costs, improving services, making use of new spectrums, and integrating better with other open standards using OFDMA on downlinks (DL), and SC-FDMA on uplinks (UL) and multiple-input multiple-output (MIMO) antenna technology.

Figure 1:
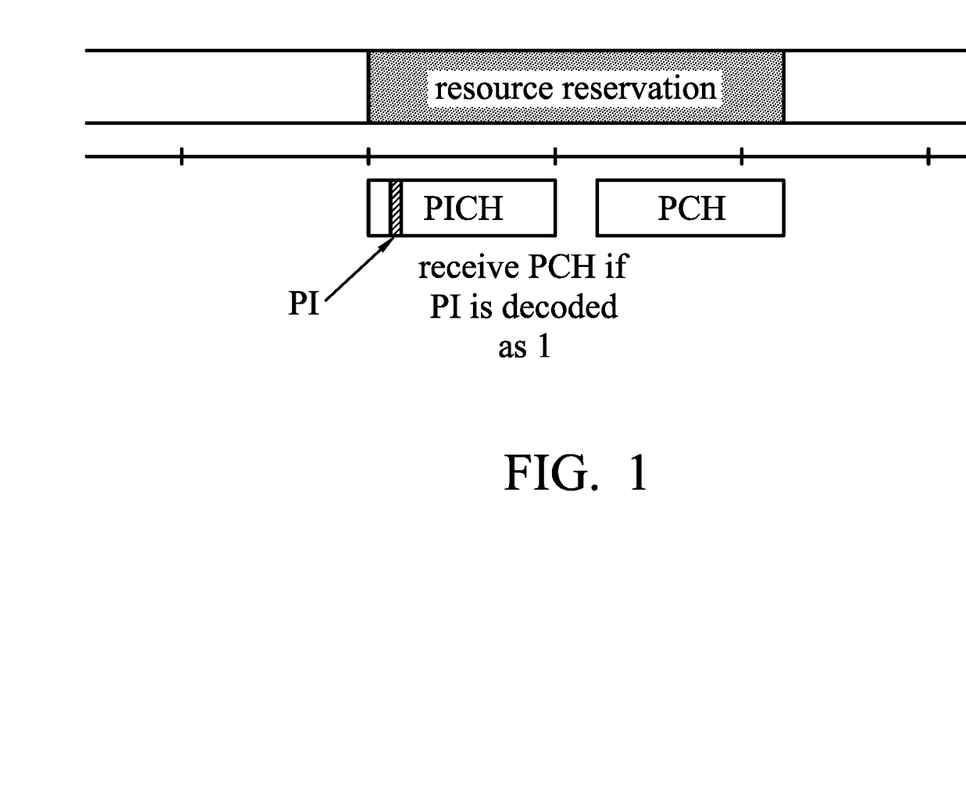
FIG. 1 is a schematic diagram illustrating that the UE monitors the paging according to the prior art.

In conventional paging monitoring method, when the user equipment (UE) monitors the paging, the UE needs to detect a paging indicator (PI) corresponding to a paging channel (PCH) in a paging indicator channel (PICH) first. If the value of the detected PI is 1, the UE will start to receive an associated PCH frame of the PCH in the Secondary-Common Control Physical Channel (S-CCPCH). FIG. 1 is a schematic diagram illustrating that the UE monitors the paging according to the prior art. As shown in FIG. 1, when the UE monitors the paging in a paging period, the UE may detect a PI corresponding to a PCH in a PICH first, and then receive an associated PCH frame of the PCH in the S-CCPCH if the value of the detected PI is 1. However, when the channel quality of the PICH is bad, the performance of the UE may suffer.

BRIEF SUMMARY OF THE INVENTION

A wireless communication method and device are provided to overcome the problems mentioned above.

An embodiment of the invention provides a wireless communication method. The wireless communication method comprises the steps of directly monitoring a paging channel (PCH) with user equipment without detecting a paging indicator (PI) in a paging indicator channel (PICH); and having the user equipment decode the data of the PCH.

In some embodiments of the invention, the wireless communication method further comprises the step of monitoring the PCH according to information of the PCH received from a network.

In some embodiments of the invention, the wireless communication method further comprises the step of using the user equipment to determine the channel quality of the PICH according to a threshold. When the channel quality of the PICH is smaller than the threshold, the PCH is directly monitored by the user equipment without detecting the PI in the PICH. When the channel quality of the PICH is larger than or equal to the threshold, the PI in the PICH is detected by the user equipment to determine whether to decode the data of the PCH.

In some embodiments of the invention, when the user equipment is capable of supporting multi-SIMs and one of the SIMs is in a packet transfer mode, the wireless communication method further comprises the step of monitoring the PCH by the user equipment through the other SIM which is in an idle mode directly without detecting the PI in the PICH.

An embodiment of the invention provides a wireless communication device. The wireless communication device comprises a processor. The processor monitors a paging channel (PCH) directly without detecting a paging indicator (PI) in a paging indicator channel (PICH) and decodes by the user equipment, data of the PCH.

Other aspects and features of the invention will become apparent to those with ordinary skill in the art upon review of the following descriptions of specific embodiments of wireless communication methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
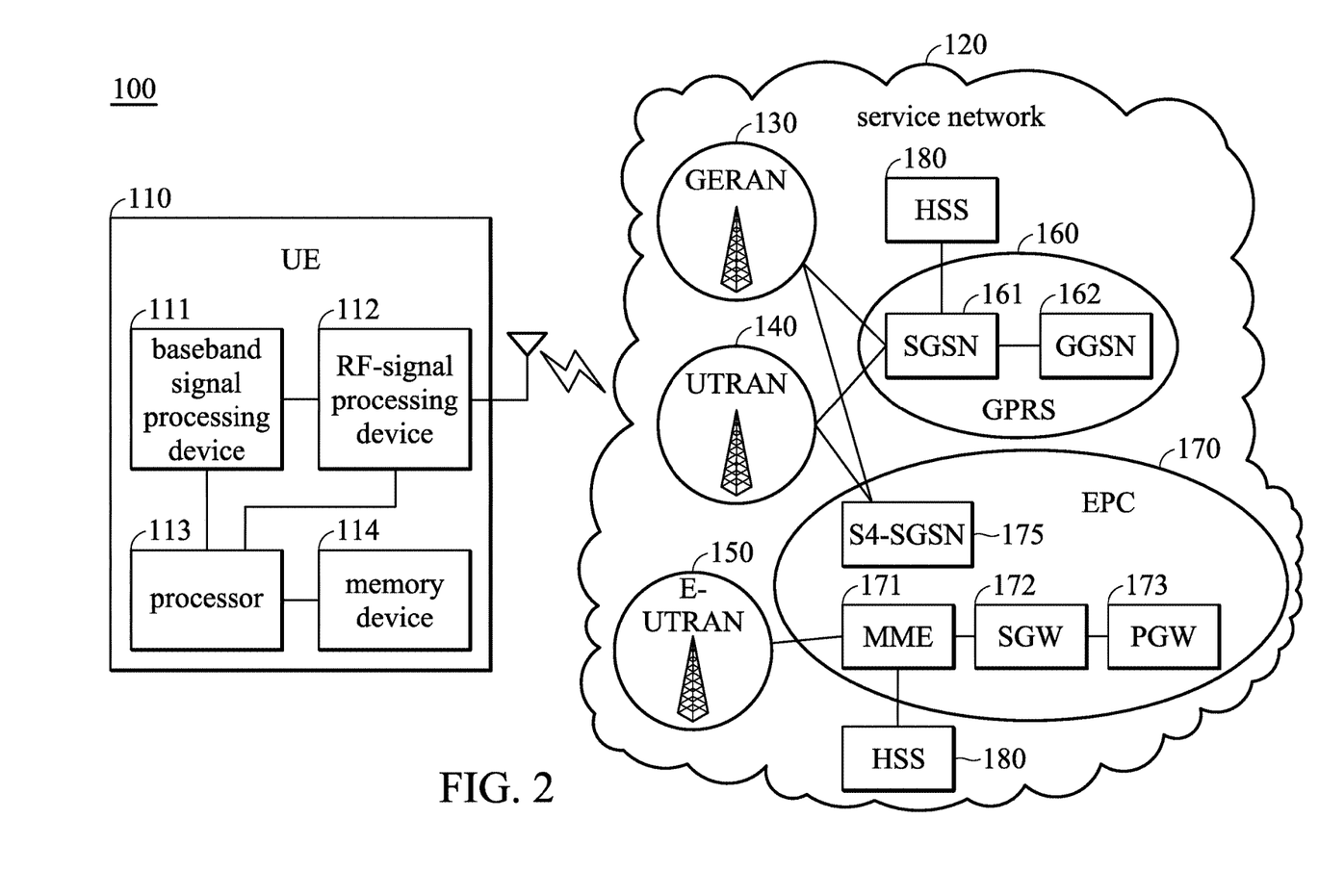
FIG. 2 is a block diagram of a mobile communications system 100 according to an embodiment of the invention.

FIG. 2 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 2.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc. In the embodiments of the invention, the RF signal processing device 112 may comprise a plurality of RF resources.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 2.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 2.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communication with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (or called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and interoperability with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communication with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may also include other functional entities, such as a Home Location Register (HLR) (not shown) which is a central database storing user-related and subscription-related information, and the invention is not limited thereto. In an embodiment of the invention, the service network 120 may also comprise a Code Division Multiple Access (CDMA) network.

In an embodiment of the invention, when the UE 110 monitors the paging, the UE 110 may monitor a paging channel (PCH) directly without detecting a paging indicator (PI) corresponding to the PCH in a paging indicator channel (PICH), wherein the PCH is a downlink transport channel and the PICH is a physical channel used to carry the paging indicators. That is to say, in this embodiment of the invention, the UE 110 is not concerned with the PI corresponding to the PCH in the PICH, and the UE 110 only needs to monitor the PCH every paging period. The paging period may be a default Discontinuous Reception (DRX) cycle. In each paging period, the UE 110 may monitor the PCH and decode the PCH data (PCH frame) in the Secondary-Common Control Physical Channel (S-CCPCH) during the period of time. The S-CCPCH is a physical channel which is used to carry the PCH and transmit the data of the PCH (i.e. PCH data).

Figure 3:
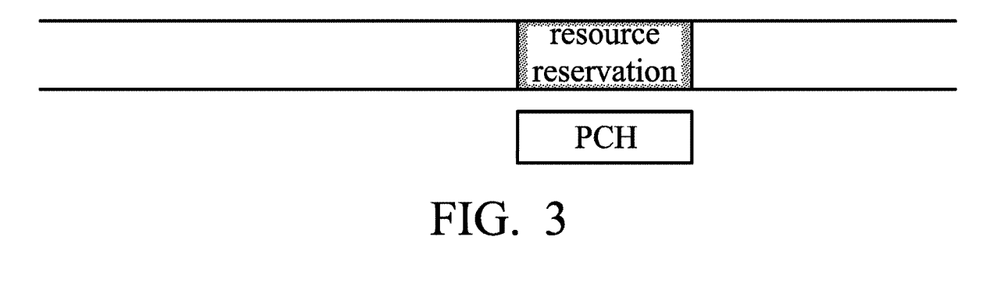
FIG. 3 is a schematic diagram illustrating that the UE 110 monitors the paging according to an embodiment of the invention.

FIG. 3 is a schematic diagram illustrating that the UE 110 monitors the paging according to an embodiment of the invention. As shown in FIG. 3, when the UE 110 monitors the paging in a paging period, the UE 110 may monitor the PCH directly without detecting the PI in the PICH. Compared to conventional communication method (e.g. FIG. 1), the time of the paging period will be shortened. Namely, when the UE 110 monitors the PCH directly without detecting the PI in the PICH, the UE 110 can reserve more RF resources for other schedules (e.g. packet transfer).

In an embodiment of the invention, when the UE 110 monitors the paging, the UE 110 may determine the channel quality of the PICH according to a threshold first. That is to say, before the UE 110 monitors the paging, the UE 110 may determine whether there is a need to detect the PI in the PICH. If the channel quality of the PICH is larger than or equal to the threshold (i.e. the PICH has good channel quality), the UE 110 may adopt conventional communication technology (as shown in FIG. 1). That is to say, the UE 110 may monitor paging by detecting a PI corresponding to the PCH in PICH first. When the value of the detected PI is 1, the UE 110 will receive and decode the associated PCH data in the S-CCPCH. When the value of the detected PI is not 1, the UE 110 will not receive the associated PCH data in the S-CCPCH. If the channel quality of the PICH is smaller than the threshold (i.e. the PICH has bad channel quality), the UE 110 may monitor the PCH directly without detecting the PI in the PICH (as shown in FIG. 3).

Figure 4:
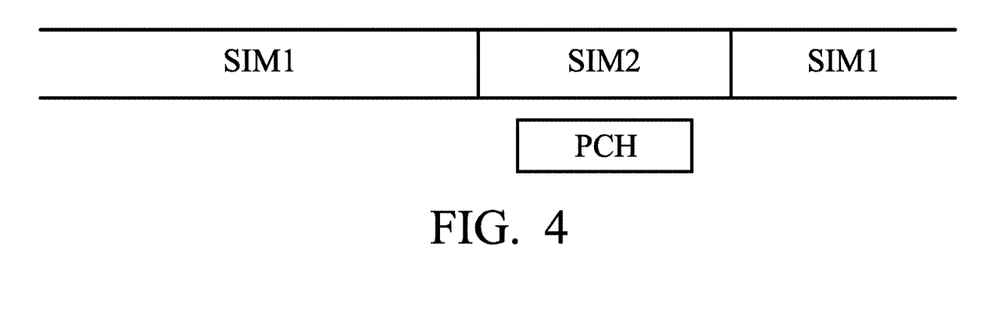
FIG. 4 is a schematic diagram illustrating that the UE 110 which supports multi-SIMs technology monitors the paging according to an embodiment of the invention.

In an embodiment of the invention, the UE 110 may support multi-SIMs technology. The UE 110 supporting multi-SIMs technology means that the UE 110 can hold more than one SIM card to handle different network services. In this embodiment of the invention, if one SIM of the UE 110 is in the packet transfer mode (e.g. a call is processed through this SIM), when the UE 110 monitors the paging through other SIMs which are in the idle mode, the UE 110 may monitor the PCH directly without detecting the PI in the PICH through these SIMs. In convention communication technology, if one SIM of the UE 110 is in the packet transfer mode (e.g. a call is processed through this SIM), when the UE 110 monitors the paging through other SIMs which are in the idle mode, the UE 110 needs to reserve RF resources to detect a PI corresponding to a PCH in a PICH first, and then receive an associated PCH frame of the PCH in the S-CCPCH if the value of the detected PI is 1. Therefore, in this embodiment of the invention, the UE 110 can reserve more RF resources, and the reserved resources can be provided to the SIM which is in the packet transfer mode.

FIG. 4 is a schematic diagram illustrating that the UE 110 which supports multi-SIMs technology monitors the paging according to an embodiment of the invention. As shown in FIG. 4, if the SIM 1 is in the packet transfer mode, when the UE 110 monitors the paging through the SIM 2 which is in the idle mode, the UE 110 may monitor the PCH directly without detecting the PI in the PICH through SIM 2 which is in the idle mode. In FIG. 4, the UE 110 can reserve more RF resources to provide to SIM 1 for the packet transfer.

In some embodiments of the invention, while the UE 110 may monitor the PCH directly without detecting the PI in the PICH, the UE 110 may monitor the PCH according to the information of the PCH received from the service network 120. The UE 110 may obtain the information of the PCH from the service network 120 in advance. In some embodiments of the invention, the information may comprise the location and period of the PCH. That is to say, when the UE 110 monitors the paging, the UE 120 can know when and where the UE 120 needs to monitor the PCH and decode the PCH data in each paging period. The information of the PCH may be carried by a system information block (SIB) which is transmitted from the service network 120.

Figure 5:
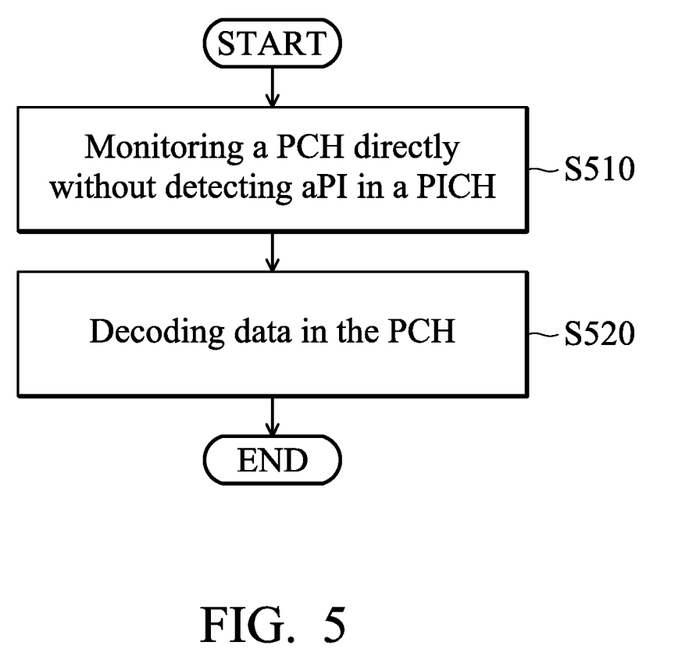
FIG. 5 is a flow chart illustrating the wireless communication method according to an embodiment of the invention.

FIG. 5 is a flow chart illustrating the wireless communication method according to an embodiment of the invention. The wireless communication method is applied to the UE 110. First, in step S510, when the UE 110 monitors the paging, the UE 110 monitors a paging channel (PCH) directly without detecting a paging indicator (PI) in a paging indicator channel (PICH). In step S520, the UE 110 decodes data in the PCH.

Figure 6:
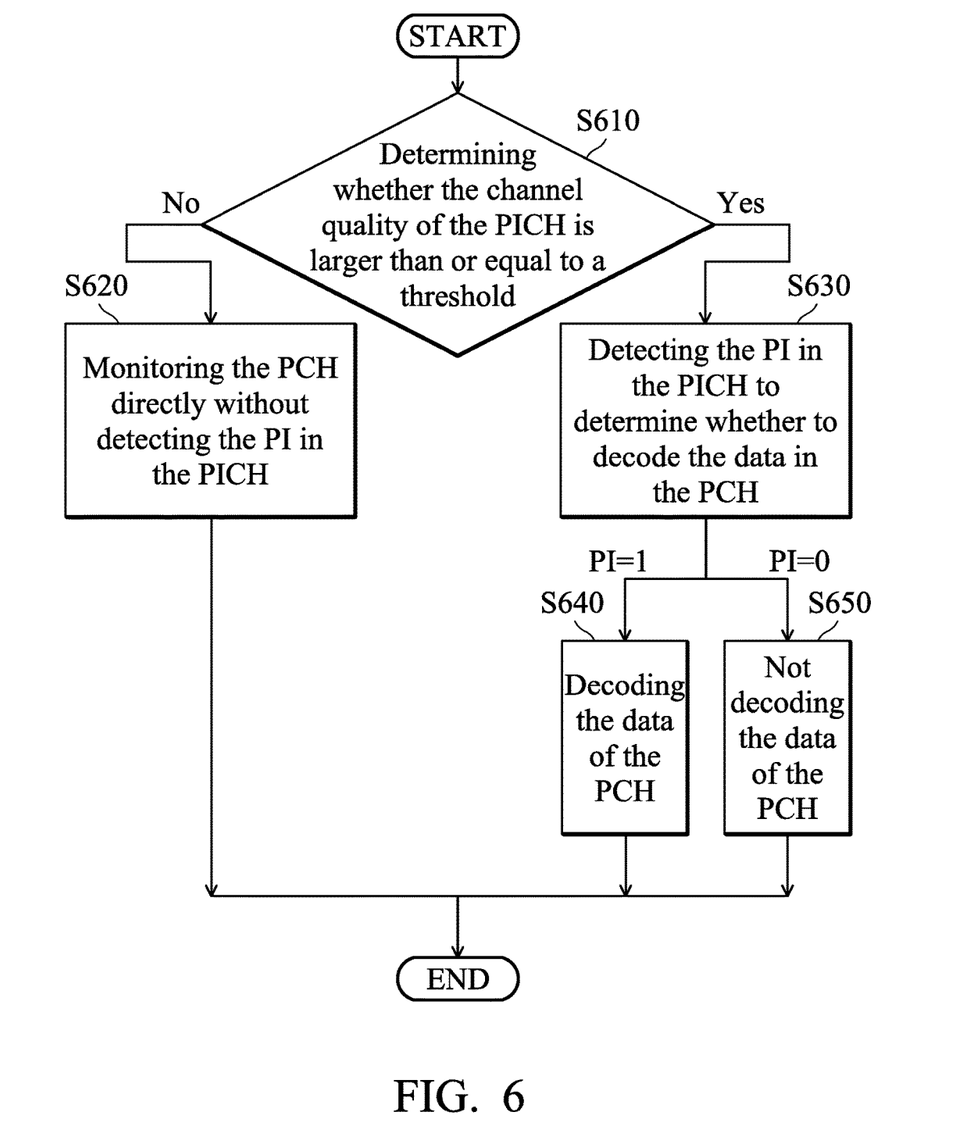
FIG. 6 is a flow chart illustrating the wireless communication method according to another embodiment of the invention.

FIG. 6 is a flow chart illustrating the wireless communication method according to another embodiment of the invention. The wireless communication method is applied to the UE 110. First, in step S610, before the UE 110 monitors the paging, the UE 110 determines the channel quality of the PICH according to a threshold, i.e. the UE 110 determines whether the channel quality of the PICH is larger than or equal to the threshold. If the channel quality of the PICH is smaller than the threshold, step S620 is performed. In step S620, the UE 110 monitors the PCH directly without detecting the PI in the PICH. If the channel quality of the PICH is larger than or equal to the threshold, step S630 is performed. In step S630, the UE 110 detects the PI in the PICH to determine whether to decode the data in the PCH. If the value of the detected PI is 1, step S640 is performed. In step S640, the UE 110 will decode the data of the PCH. If the value of the detected PI is not 1, step S650 is performed. In step S650, the UE 110 will not decode the data of the PCH.

Figure 7:
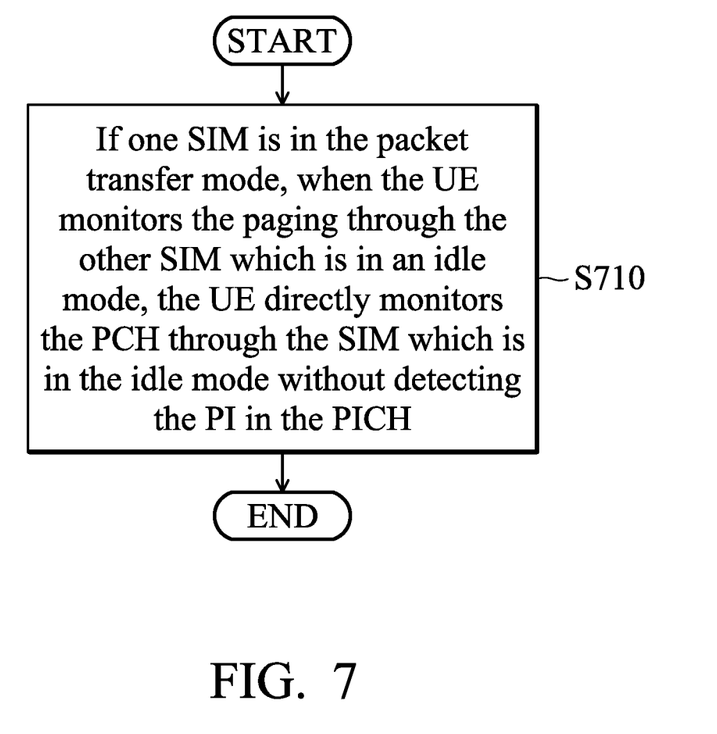
FIG. 7 is a flow chart illustrating the wireless communication method according to another embodiment of the invention.

FIG. 7 is a flow chart illustrating the wireless communication method according to another embodiment of the invention. The wireless communication method is applied to the UE 110. In this embodiment of the invention, the UE 110 supports multi-SIMs technology. In step S710, if one SIM of the UE 110 is in the packet transfer mode (e.g. a call is processed through this SIM), when the UE 110 monitors the paging through the other SIM which is in an idle mode, the UE 110 directly monitors the PCH through the SIM which is in the idle mode without detecting the PI in the PICH. In this embodiment of the invention, the UE 110 can reserve more RF resources and the reserved resources can be provided to the SIM which is in the packet transfer mode.

In the wireless communication method of the invention, the UE may monitor the PCH directly without detecting a PI in a PICH. Therefore, more RF resources can be reserved. In addition, in the wireless communication method of the invention, when the channel quality of the PICH is bad, the UE can monitor the PCH directly without detecting a PI in a PICH to avoid the performance degradation. In addition, in the wireless communication method of the invention, for multi-SIMs UE, the UE can provide more RF resources to the SIM which is in the packet transfer mode.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method, comprising:
    determining, by user equipment, channel quality of a paging indicator channel (PICH) according to a threshold;
    monitoring, by the user equipment, a paging channel (PCH) without detecting, by the user equipment, a paging indicator (PI) in the PICH first when the channel quality of the PICH is smaller than the threshold; and
    detecting, by the user equipment, the PI in the PICH to determine whether to decode the data of the PCH when the channel quality of the PICH is larger than or equal to the threshold.

2. The wireless communication method of claim 1, further comprising:
    monitoring, by the user equipment, the PCH according to information of the PCH received from a network.

3. The wireless communication method of claim 1, wherein when the user equipment is capable of supporting multi-SIMs and one of the SIMs is in a packet transfer mode, the wireless communication method further comprises:
    monitoring, by the user equipment, the PCH through the other SIM which is in an idle mode without detecting the PI in the PICH.

4. A wireless communication device, comprising:
    a processor, determining channel quality of a paging indicator channel (PICH) according to a threshold, wherein the processor monitors a paging channel (PCH) without detecting a paging indicator (PI) the PICH first when the channel quality of the PICH is smaller than the threshold, and wherein the processor detects the PI in the PICH to determine whether to decode the data of the PCH when the channel quality of the PICH is larger than or equal to the threshold.

5. The wireless communication device of claim 4, wherein the processor further monitors the PCH according to information of the PCH received from a network.

6. The wireless communication method of claim 4, wherein when the user equipment is capable of supporting multi-SIMs and one of the SIMs is in a packet transfer mode, the processor directly monitors the PCH through the other SIM which is in an idle mode without detecting the PI in the PICH.

* * * * *